United States Patent
Triglavcanin

(10) Patent No.: US 8,197,697 B2
(45) Date of Patent: Jun. 12, 2012

(54) METHOD FOR THICKENING AND THICKENING APPARATUS

(75) Inventor: Richard Triglavcanin, Dalkeith (AU)

(73) Assignee: Outotec Oyj, Espoo (FI)

( * ) Notice: Subject to any disclaimer, the term of this patent is extended or adjusted under 35 U.S.C. 154(b) by 316 days.

(21) Appl. No.: 12/528,031

(22) PCT Filed: Feb. 21, 2008

(86) PCT No.: PCT/FI2008/050078
§ 371 (c)(1), (2), (4) Date: Aug. 20, 2009

(87) PCT Pub. No.: WO2008/102058
PCT Pub. Date: Aug. 28, 2008

(65) Prior Publication Data
US 2011/0247987 A1   Oct. 13, 2011

(30) Foreign Application Priority Data
Feb. 22, 2007 (AU) .................................. 20070150

(51) Int. Cl.
*B01D 21/24* (2006.01)
(52) U.S. Cl. ........ 210/739; 210/741; 210/800; 210/137; 210/519; 210/532.1
(58) Field of Classification Search ................ 210/739, 210/741, 800, 801, 97, 137, 519, 528, 532.1
See application file for complete search history.

(56) References Cited

U.S. PATENT DOCUMENTS

| | | | |
|---|---|---|---|
| 3,227,278 A * | 1/1966 | Johnson | 210/137 |
| 3,770,131 A | 11/1973 | Davis et al. | |
| 3,926,805 A | 12/1975 | Walker | |
| 4,392,955 A * | 7/1983 | Soriente | 210/528 |
| 5,271,853 A * | 12/1993 | Batten | 210/519 |
| 5,389,250 A | 2/1995 | Wood et al. | |
| 6,800,209 B2 * | 10/2004 | Wright | 210/801 |
| 6,966,985 B2 | 11/2005 | Schoenbrunn et al. | |
| 7,591,946 B2 * | 9/2009 | Taylor | 210/519 |
| 7,981,299 B2 * | 7/2011 | Triglavcanin et al. | 210/519 |
| 2005/0211607 A1 * | 9/2005 | Armbruster | 210/97 |

* cited by examiner

*Primary Examiner* — Christopher Upton
(74) *Attorney, Agent, or Firm* — Chernoff, Vilhauer, McClung & Stenzel

(57) ABSTRACT

The invention relates to a method and apparatus for thickening liquids carrying suspended particles, such as slurry containing minerals, by using a thickening apparatus (1) comprising a tank (2) whereby pulp of higher relative density tends to settle towards the bottom of the tank, forming a bed of thickened pulp (3), and dilute liquid (9) of lower relative density is thereby displaced towards the top of the tank, a feedwell (4), which includes a chamber having means for receiving fed material (5), such as slurry and at least one outlet in fluid communication with the tank and means for distributing the material in the tank, at least one feedpipe (8) for feeding the material (5), at least slurry, into the feedwell, when the feedpipe cross-sectional area for the fed material (5) is constantly varying when the flowrate inside the feedpipe (8) varies.

20 Claims, 3 Drawing Sheets

METHOD FOR THICKENING AND THICKENING APPARATUS

Figure 1:
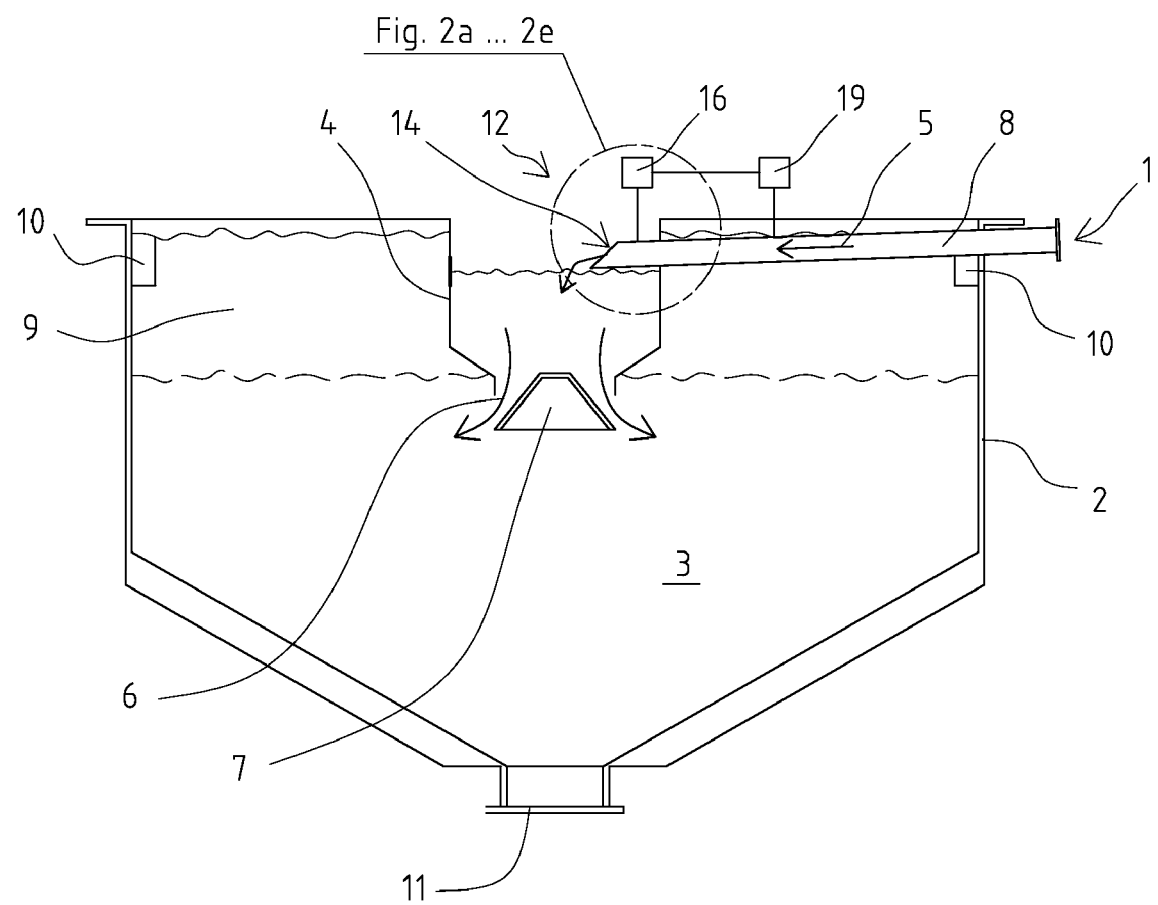

This is a national stage application filed under 35 USC 371 based on International Application No. PCT/FI2008/050078 filed Feb. 21, 2008 and claims priority under 35 USC 119 of Finnish Patent Application No. 20070150 filed Feb. 22, 2007.

This invention relates in general to solid-liquid separation. More detailed the invention relates to a method and apparatus for thickening when feeding of material inside the feedwell is adjusted to flowrate variations inside the feedpipe.

In a clarification or thickening process a slurry comprising liquids carrying suspended particles is introduced into the thickener or settling tank in order to separate particles from liquid. Basic components of a thickener are bridge and tank, drive, feedpipe, feedwell, rakes (including shaft and scrapers), underflow cone and overflow launder. In the tank the suspended particles form a thickened mud on the bottom of the tank. The thickened material settles to the bottom of the thickener tank and is further removed and processed, while the liquor component rises to the upper part of the thickener to flow into the overflow launder and exits the overflow box. A rake is arranged to move the viscous solids settled on the bottom of the thickener towards an underflow cone positioned in the center of the thickener tank. Slurry enters the thickener through the feedpipe and feedwell. The rate of settling is often increased using an optimized amount and type of flocculating agents. The flocculant is added into the feed in order to agglomerate the suspended particles of the slurry. The idea in flocculation is to bind solid particles together to assist the gravity based separation process. In flocculating certain pulps, it is sometimes necessary to first dilute the pulp in order for efficient flocculation to take place when a flocculant is added.

A feedwell is often used to feed the slurry into the thickener tank through the bottom of the feedwell and to provide means for flocculating a slurry before entering the tank. Also the thickener feedwell's function is to mix the slurry feed with flocculant and allow the flocculated solids to settle. The feedwell is typically located in the middle of the thickener tank to allow these settling solids to be evenly distributed within the thickener tank. To make the flocculation process more effective and efficient the slurry feed usually needs to be diluted with extra process liquid. The dilution is usually achieved in thickeners by recycling some of the dilute liquid overflow from the top of the thickener tank back to the feedpipe and/or feedwell in order to dilute the inflowing pulp. In order to recycle the overflow liquor sometimes pumps, fluid lines and valves need to be installed. One way to dilute the slurry is to circulate the dilution liquid from outside the feedwell to inside the feedwell through an opening in the feedwell wall or through a separate conduit.

Sometimes there occurs a problem inside the feedwell, when there is a tendency for the fed material to flow directly to the bottom outlet. The retention time for solid particles inside the feedwell is low. Then those particles do not effectively mix with dilution liquid and the flocculant. The particles simply flow straight across the feedwell, downwards and out. This tendency is greater for the coarse particle fraction of the incoming solids feed. As a result, the diluting liquid is not properly mixed in with the feed material and only partial flocculation may occur. The mixing effect inside the feedwell has to be effective in order to mix the feed slurry with the dilution liquid and the flocculant properly.

Also there are problems how to mix dilution water, flocculant and feed slurry better together so that the mixing is ideal for the process. There is a problem how to reduce the loss of mixing caused by the loss of volumetric flow, that is the loss of the feed slurry velocity into the feedwell for mixing. This mixing is both dilution of the raw feed slurry and the flocculating of the diluted feed slurry. When the flowrate inside the feedpipe is decreased for some reason, hence inlet velocity of the flowing material into the feedwell is decreased, there is the real possibility for the high density feed slurry entering the feedwell and flowing down and out of the feedwell without being diluted or flocculated. This is known as "Short Circuiting". The fed material, feed slurry, flows down and exits too quickly from the feedwell instead of flowing around and eventually out of the feedwell. When something occurs that causes a portion of the thickening plant to go offline, or reduce capacity of the plant, the volumetric flow to the thickener is reduced, which causes the reduction in velocity and the short circuiting issue illustrated above. There is a need to look at maintaining the feed velocity exiting the feedpipe when there is a reduction in volumetric flow as the feed velocity reduces with reduction in volumetric flow. If not maintained, the adequate mixing velocity is not being inputted into the feedwell. As a result of this, feed inlet velocity is reducing, the feedwell volume that needs to be mixed is the same, so the inlet velocity is not enough to effectively mix the feed stream within the feedwell volume.

The object of this invention is to provide a thickening apparatus and method, whereby the feeding of the material into the feedwell is adjusted to flowrate variations by changing the feedpipe cross-sectional area in order to keep the feeding velocity as a constant even if the flow rate inside the feedpipe varies. By maintaining the entry velocity of the fed material into the feedwell, the possibility of short circuiting inside the feedwell is being stopped or at least significantly reduced, and better dilution of the feed and better flocculation of the solids, ie better mixing is achieved. Also better rotation of the slurry within the feedwell is achieved, which in turn aids the mixing process.

According to the method and apparatus of the invention, the mixing of feed slurry, dilution liquor and flocculant within the feedwell is being enhanced by adjusting the feeding operation to flow rate variations inside the feedpipe. The feedpipe cross-sectional area for the fed material is constantly varying when the flowrate inside the feedpipe varies. In order to maintain efficient mixing inside the feedwell, or at least to have the best mixing possible, the purpose of the invention is to maintain feed slurry entry velocity from the feedpipe to the feedwell constant even if the flowrate inside the feedpipe decreases. According to one embodiments of the invention the feedpipe cross-sectional area for the fed material is continuously being varied by adjusting mechanism, which for example squeezes the feedpipe from at least one side in order to change the cross-sectional area of the feedpipe near the feedpipe exit. According to another embodiment of the invention the adjusting mechanism is equipped with means, which at least partly close the feedpipe exit, which means that end of the feedpipe from where the material flows into the feedwell. For example this could be used to restrict the flow of the slurry feed out the end of the feedpipe. Embodiments of the invention would be for example a pinch valve or a cutter valve type solutions. According to the invention the adjusting mechanism is actuating electrically, pneumatically or hydraulically, or similar in order to easily change the cross-sectional area of the feedpipe. According to one embodiment of the invention the feedpipe cross-sectional area for the fed material is controlled by pressure, flow rate and/or velocity variations of the flowing material inside the feedpipe. When the parameters from the process are known, it could be used to predict the situation where the feedpipe cross-sectional area variation is needed. When the flowrate inside the feedpipe is decreasing, the feedpipe cross-sectional area for the fed material is decreased by adjusting mechanism. The apparatus and method of the current invention reduces the short-circuiting of the fed material and promotes mixing of the feed, dilution and flocculant streams.

The advantage of the invention is also to maintain a velocity which in turn maximises the possible mixing efficiency within the feedwell. The presented method and apparatus of the invention is variable and easily actuated, so that adjusted to suit as many process feed throughput variations as possible.

Figure 2A:
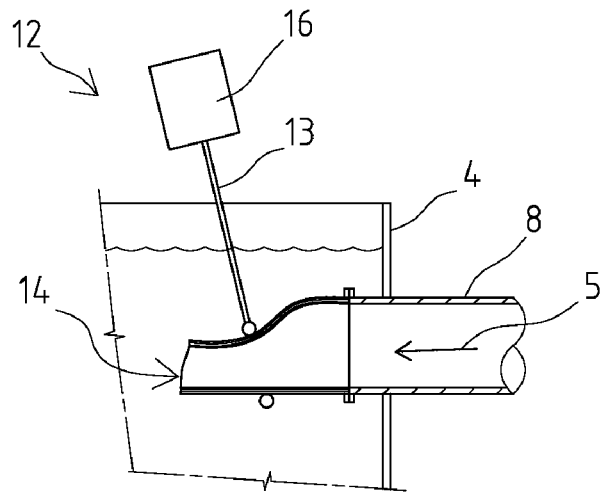
Figure 2B:
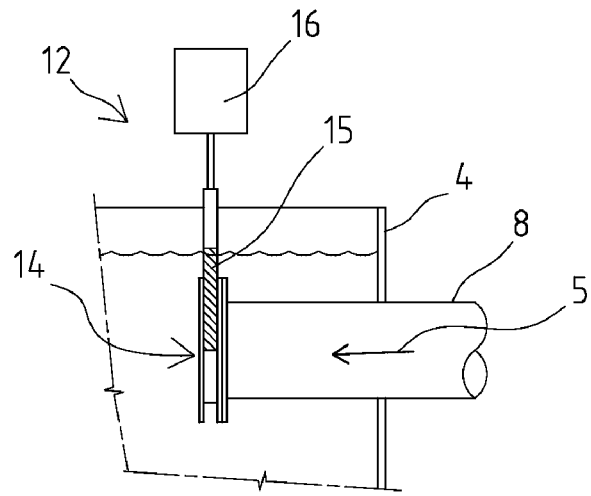
Figure 2C:
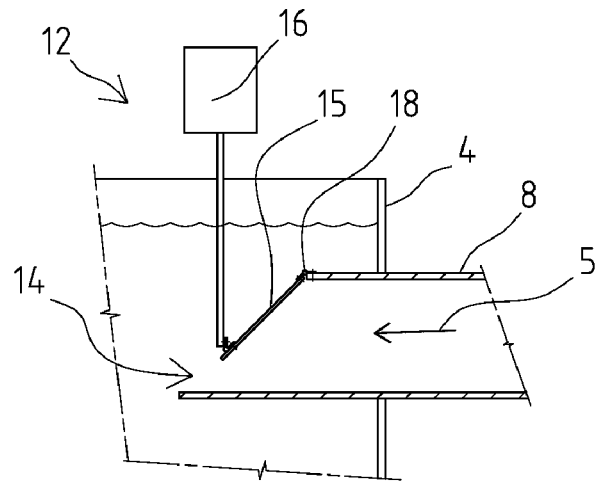
Figure 2D:
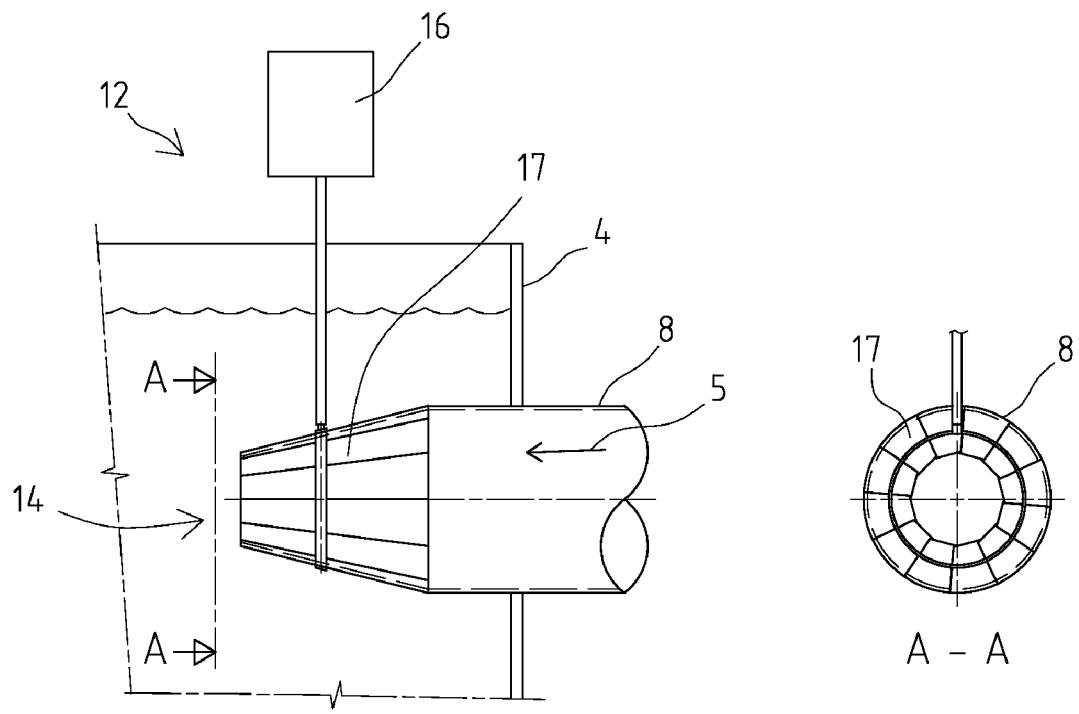
Figure 2E:
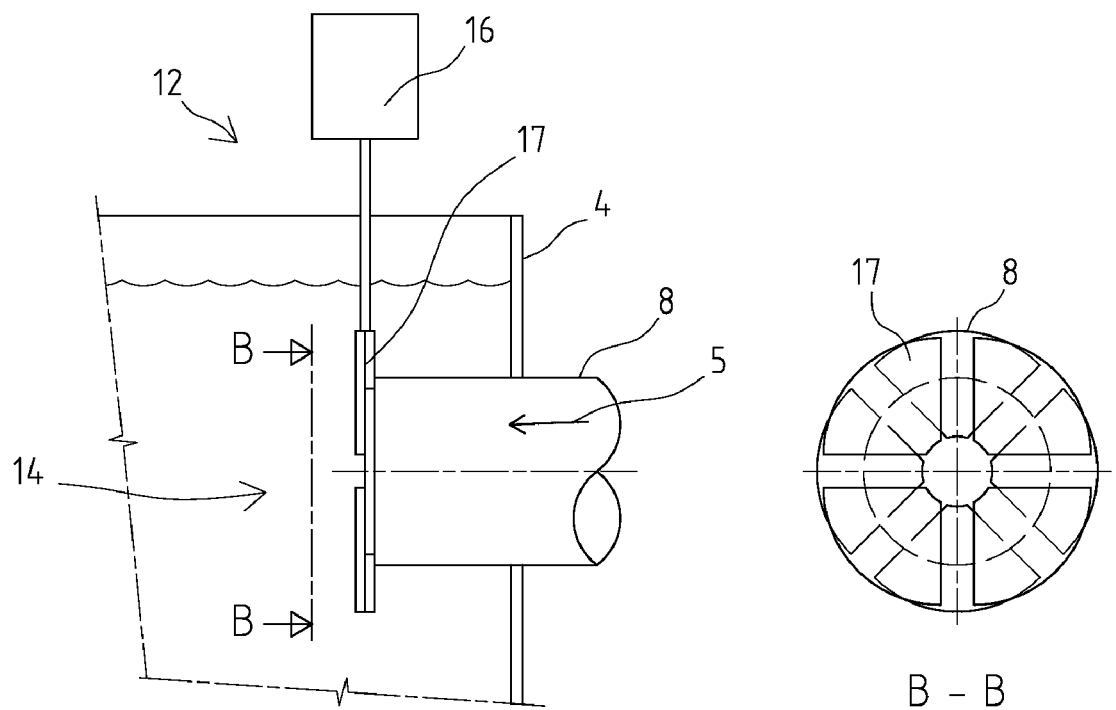

The invention is described in more detail in the following figures:

FIG. 1 is a schematic presentation of the thickening apparatus according to the present invention FIG. 2a is a schematic presentation of one embodiment of the invention FIG. 2b. is a schematic presentation of one embodiment of the invention FIG. 2c. is a schematic presentation of one embodiment of the invention FIG. 2d. is a schematic presentation of one embodiment of the invention FIG. 2e is a schematic presentation of one embodiment of the invention The thickening apparatus according to one preferred embodiment of the present invention comprises a thickener 1 with a circular tank 2 for containing liquid pulp 3. The feedwell 4 is normally arranged in the middle of the tank 2 and it is supplied with means for feeding material 5, such as slurry, diluting material and flocculating agent inside the feedwell. Usually flocculating agent is fed when needed. The feedwell has a bottom opening 6 in fluid communication with the tank 2 and through which liquid pulp in the feedwell can flow into the tank. The bottom section of the feedwell wall preferably comprises a downwardly conical plate 7, so that the flow area of the liquid is smaller in the bottom section than in the above section in order to restrict the flow of liquid between the tank and the feedwell. Flocculating agent is mixed into the slurry, normally inside the feedwell 4 during feeding the slurry into the tank through at least one feedpipe 8, launder or similar through the wall of the feedwell. The flocculating agent promotes the settling of the mineral slurry to the bottom of the tank and into the underflow cone. In normal operation, settling of solids takes place in the thickener tank 2, whereby a bed of thickened pulp 3 settles to displace an upper layer of relatively dilute liquid 9 towards the top of the tank. The thickener tank is surrounded by an overflow launder 10, which channels excess overflow liquid to a discharge pipe. The concentrated slurry is withdrawn from the underflow cone via an outlet line 11.

According to the invention the feedpipe 8 cross-sectional area is continuously being varied based on changes in the volumetric flowrate of the flowing material inside the feedpipe in order to maintain the entry velocity of the fed material constant, when the flowrate inside the feedpipe 8 varies. The feedpipe 8 cross-sectional area for the fed material into the feedwell is changed by adjusting mechanism 12, which according to one example of the invention is made to squeeze the feedpipe 8 from at least one side, preferably near the feedpipe exit 14 as described in FIG. 2a. Then the diameter of the feedpipe 8 is reduced from the point where squeezed. The adjusting mechanism 12 is equipped with at least one pinch valve 13 or similar for squeezing the feedpipe 8. When squeezing the feedpipe, the feedpipe cross-sectional area for the slurry flow decreases and the entry velocity for the material is kept constant even if the flowrate inside the feedpipe decreases. The adjusting mechanism 12 could be attached to the feedwell wall or some other way to the thickener 1.

According to one embodiment of the invention described in FIGS. 2b and 2c, the adjusting mechanism 12 is equipped with at least one plate 15, like gate valve for at least partly closing the feedpipe exit 14, when the feedpipe cross-sectional area for the fed material into the feedwell is decreasing in the feedpipe 8 exit 14. The plate 15 is being moved by actuating mechanism 16, which is acting for example by hydraulic means. According to one embodiment described in FIG. 2c of the invention, the plate 15 is made to swing in relation to the feedpipe exit 14, when the plate is attached to the feedpipe 8 in the way that it is hinged near the feedpipe exit 14 from at least one point 18. When the plate 15 is hinged, it could operate either automatically or by actuating mechanism 16 to the flowrate variations inside the feedpipe 8.

According to the examples of the invention presented in FIGS. 2d and 2e, at least part of the feedpipe cross-sectional area near the feedpipe exit 14 is made variable, meaning that the orifice diameter of the feedpipe is made variable, like in venturi type pipe (2d). In connection with the feedpipe exit 14 there are arranged vanes 17 or similar, which could be moved by actuating mechanism 16 in order to change the feedpipe cross-sectional area when needed. The vanes 17 could be attached either near the feedpipe exit 14 or at the end of the feedpipe exit. The vanes 17 are arranged so, that they can be moved either partly closing the feedpipe exit 14 or closing the feedpipe exit totally.

The adjusting mechanism 12 could be actuating electrically, pneumatically or hydraulically or some other way by arranging an actuating mechanism 16 in connection with adjusting mechanism. The feedpipe flow area variations near the feedpipe exit could be controlled by pressure, flow rate and/or velocity variations inside the feedpipe 8 when those parameters are measured by a control mechanism 19 attached in connection with the adjusting mechanism 12.

According to one example of the invention, if the slurry is fed into the feedpipe at a volumetric flowrate of 400 m$^3$/h, when the thickener is designed for a maximum (100%) flow. Then to have a velocity of 2 m/s for the flowing material, the feedpipe 8 diameter is 266 mm. Then the flowrate decreases to 300 m$^3$/h (75% of thickener design) resulting from process difficulties, and the velocity inside the feedpipe will be of 1.5 m/s. In order to maintain the entry velocity 2 m/s for the material flowing into the feedwell, the diameter of the feedpipe would need to be reduced to 230 mm. That is, to allow for the exit velocity of the slurry from the feedpipe exit 14 to be as close to design velocity of the thickener as possible.

While the invention has been described with reference to its preferred embodiments, it is to be understood that modifications and variations will occur to those skilled in the art. Such modifications and variations are intended to fall within the scope of the appended claims.

The invention claimed is:

1. A method for thickening a liquid carrying suspended particles utilizing a thickening apparatus that comprises a tank having a bottom and a top, a feedwell defining a chamber for receiving feed material and having at least one outlet in fluid communication with the tank, and at least one feedpipe for feeding the feed material into the feedwell, whereby the feed material passes from the feedwell into the tank and pulp of higher relative density tends to settle towards the bottom of the tank, forming a bed of thickened pulp, and dilute liquid of lower relative density is thereby displaced towards the top of the tank, the method comprising:

feeding feed material into the feedwell through the feedpipe, and adjusting a cross-sectional area of the feedpipe in response to change in volumetric flow rate of feed material in the feedpipe, so as to maintain the velocity of feed material exiting the feedpipe when there is a reduction in volumetric flow rate.

2. The method according to claim 1, comprising adjusting the cross-sectional area of the feedpipe by squeezing the feedpipe from at least one side.

3. The method according to claim 1, comprising adjusting the cross-sectional area of an outlet opening of the feedpipe.

4. The method according to claim 1, comprising adjusting the cross-sectional area of the feedpipe by at least partly closing an outlet opening of the feedpipe.

5. The method according to claim 1, comprising adjusting the cross-sectional area of the feedpipe employing an adjusting mechanism that is actuated electrically, pneumatically, or hydraulically.

6. The method according to claim 1, comprising adjusting the cross-sectional area of the feedpipe in response to variations in at least one of pressure, flow rate and velocity of the feed material in the feedpipe.

7. The method according to claim 1, comprising decreasing the cross-sectional area of the feedpipe in response to decrease in volumetric flow rate of feed material in the feedpipe.

8. The method according to claim 1, wherein the feed material comprises mineral particles suspended in liquid and the method comprises removing the thickened pulp containing mineral particles from the tank.

9. The method according to claim 1, comprising adding flocculant to the feed material in the feedwell.

10. The method according to claim 1, comprising detecting variations in at least one of pressure, flow rate and velocity of the feed material in the feedpipe and adjusting the cross-sectional area of the feedpipe in response to the detected variations.

11. A thickening apparatus for thickening liquids carrying suspended particles, such as slurry containing minerals, the thickening apparatus comprising:
    a tank for receiving feed material, the tank having a top and a bottom and in which pulp of higher relative density tends to settle towards the bottom of the tank, forming a bed of thickened pulp, and dilute liquid of lower relative density is thereby displaced towards the top of the tank,
    a feedwell defining a chamber for receiving feed material and at least one outlet in fluid communication with the tank,
    at least one feedpipe for feeding the feed material into the feedwell, the feedpipe being adjustable in cross-sectional area, and
    an adjusting mechanism responsive to volumetric flow rate of feed material in the feedpipe to adjust the cross-sectional area of the feedpipe so as to maintain the velocity of feed material exiting the feedpipe when there is a reduction in volumetric flow rate.

12. The apparatus according to claim 11, wherein the adjusting mechanism comprises a device for squeezing the feedpipe from at least one side.

13. The apparatus according to claim 11, wherein the adjusting mechanism comprises a device for at least partly closing an outlet opening of the feedpipe.

14. The apparatus according to claim 11, wherein the adjusting mechanism comprises a device for adjusting the cross-sectional area of an outlet opening of the feedpipe.

15. The apparatus according to claim 11, wherein the adjusting mechanism comprises at least one plate that is hinged in relation to the feedpipe.

16. The apparatus according to claim 11, wherein the adjusting mechanism comprises vane elements that surround an outlet opening of the feedpipe and are arranged at least partly to close the outlet opening of the feedpipe.

17. The apparatus according to claim 11, comprising a control mechanism operatively coupled to control variation in the feedpipe cross-sectional area.

18. The apparatus according to claim 17, wherein the control mechanism is operative to measure at least one of pressure, flow rate and velocity of the feed material flowing in the feedpipe.

19. The apparatus according to claim 11, comprising an actuating mechanism operatively coupled to the adjusting mechanism for causing the adjusting mechanism to adjust the cross-sectional area of the feedpipe.

20. The apparatus according to claim 11, wherein the adjusting mechanism is at least partly attached to a wall of the feedwell.

* * * * *